United States Patent
Lu et al.

(10) Patent No.: US 12,072,842 B2
(45) Date of Patent: Aug. 27, 2024

(54) SOFTWARE-BASED LOG MANAGEMENT

(71) Applicant: Dell Products L.P., Round Rock, TX (US)

(72) Inventors: Wencheng Lu, Shanghai (CN); Xiaoxuan Dong, Shanghai (CN); Xiaowei Shen, Shanghai (CN); Joseph Shi, Shanghai (CN); Celine Ling Xu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 17/743,192

(22) Filed: May 12, 2022

(65) Prior Publication Data

US 2023/0334020 A1    Oct. 19, 2023

(30) Foreign Application Priority Data

Apr. 15, 2022  (CN) ......................... 202210414725.X

(51) Int. Cl.
*G06F 16/17* (2019.01)
*G06F 8/41* (2018.01)
*G06F 9/30* (2018.01)

(52) U.S. Cl.
CPC .......... *G06F 16/1734* (2019.01); *G06F 8/433* (2013.01); *G06F 9/30018* (2013.01); *G06F 9/3017* (2013.01)

(58) Field of Classification Search
CPC ................. G06F 16/1734; G06F 8/433; G06F 9/30018; G06F 9/3017; G06F 11/3636; G06F 17/40; G06F 11/362; G06F 11/0736; G06F 11/3476
See application file for complete search history.

(56) References Cited

U.S. PATENT DOCUMENTS

| | | |
|---|---|---|
| 2010/0107017 A1 * | 4/2010 | Munjal ............... G06F 11/0715 714/49 |
| 2016/0342455 A1 | 11/2016 | Narayanan |
| 2018/0349263 A1 | 12/2018 | Chaiken |
| 2020/0341868 A1 | 10/2020 | Carpenter et al. |
| 2021/0157583 A1 * | 5/2021 | Yuile ...................... G06F 9/542 |

* cited by examiner

*Primary Examiner* — Albert M Phillips, III
(74) *Attorney, Agent, or Firm* — Larson Newman, LLP

(57) ABSTRACT

An information handling system determines a first function identifier associated with an error message, determines a second function identifier associated with the first function identifier, and sets a center parameter value and a width parameter value that are used to calculate a movable range that includes the first function identifier and the second function identifier.

20 Claims, 6 Drawing Sheets

Legend
○ Log message will not print/write
● Log message will print/write

Legend
○ Log message will not print/write
● Log message will print/write

SOFTWARE-BASED LOG MANAGEMENT

FIELD OF THE DISCLOSURE

The present disclosure generally relates to information handling systems, and more particularly relates to software-based log management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may determine a first function identifier associated with an error message, determine a second function identifier associated with the first function identifier, and set a center parameter value and a width parameter value that are used to calculate a movable range that includes the first function identifier and the second function identifier.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
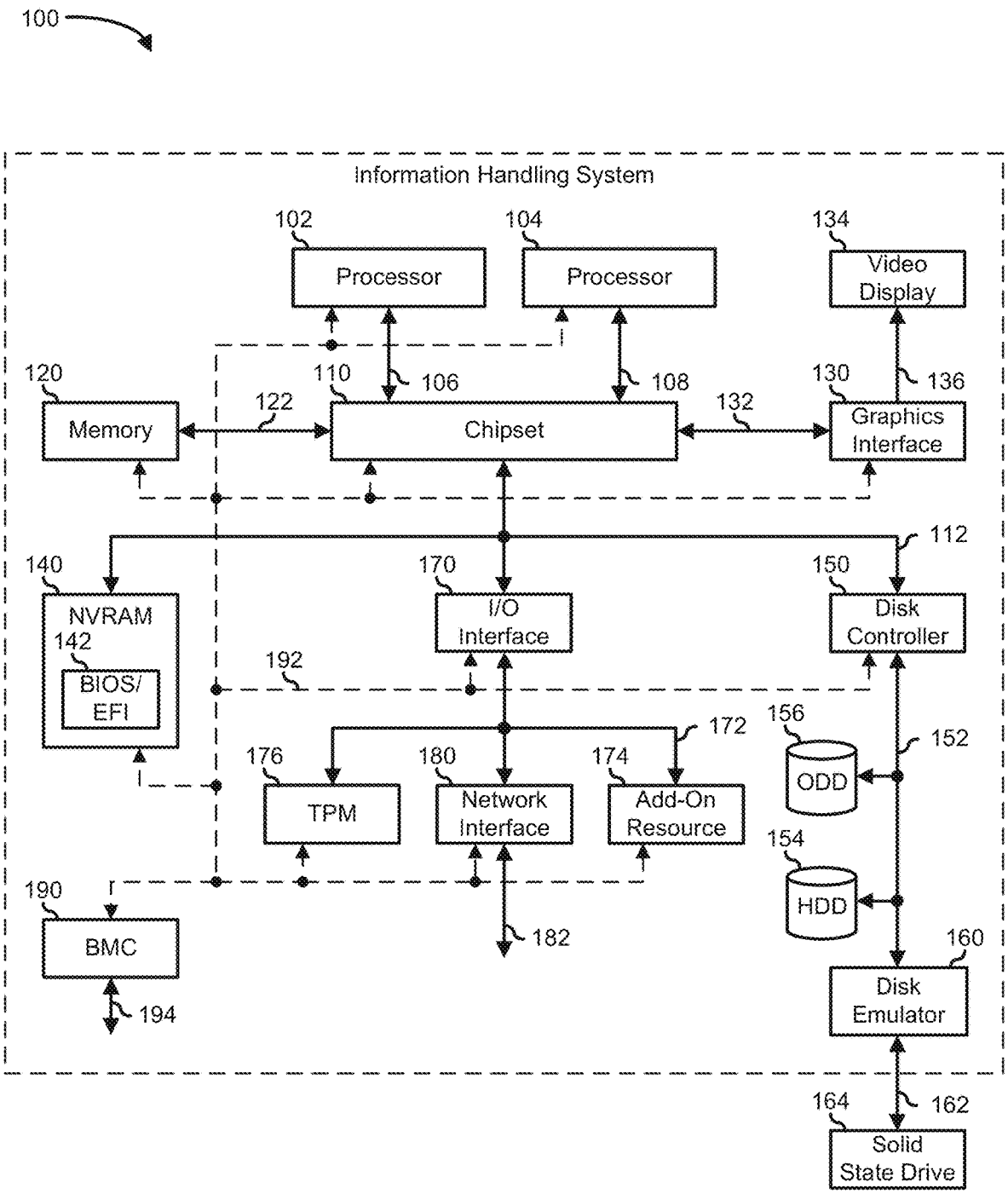
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

In embedded systems, log messages are typically put into log files for analysis and debugging by testers and developers. Because of the limited space in embedded systems, such as BMC 190 of FIG. 1, a default log level is typically limited in the production environment to print minimal log messages. Thus when an issue occurs, additional logging information to assist in debugging is desirable. However because log levels for embedded systems are typically hard-coded, they cannot be changed at runtime in the production environment which typically requires an external debug equipment. The external debug is also typically used to determine whether a function is covered by a test case. As such, debugging issues of embedded systems in the production environment as well as determining code coverage is at least cumbersome if not technically challenging.

Thus, a system and method to address the aforementioned issues are desirable. Accordingly, the present disclosure provides a system and method to automatically print or write additional logging information to aid in troubleshooting and/or identifying the issues at runtime. In addition, the present disclosure allows the masking of a portion of the logs which minimizes noise or irrelevant information. Hence, the present disclosure improves the technological field associated with embedded systems by improving the software-based ability to debug and/or identify issues associated with the embedded systems at runtime.

Figure 2:
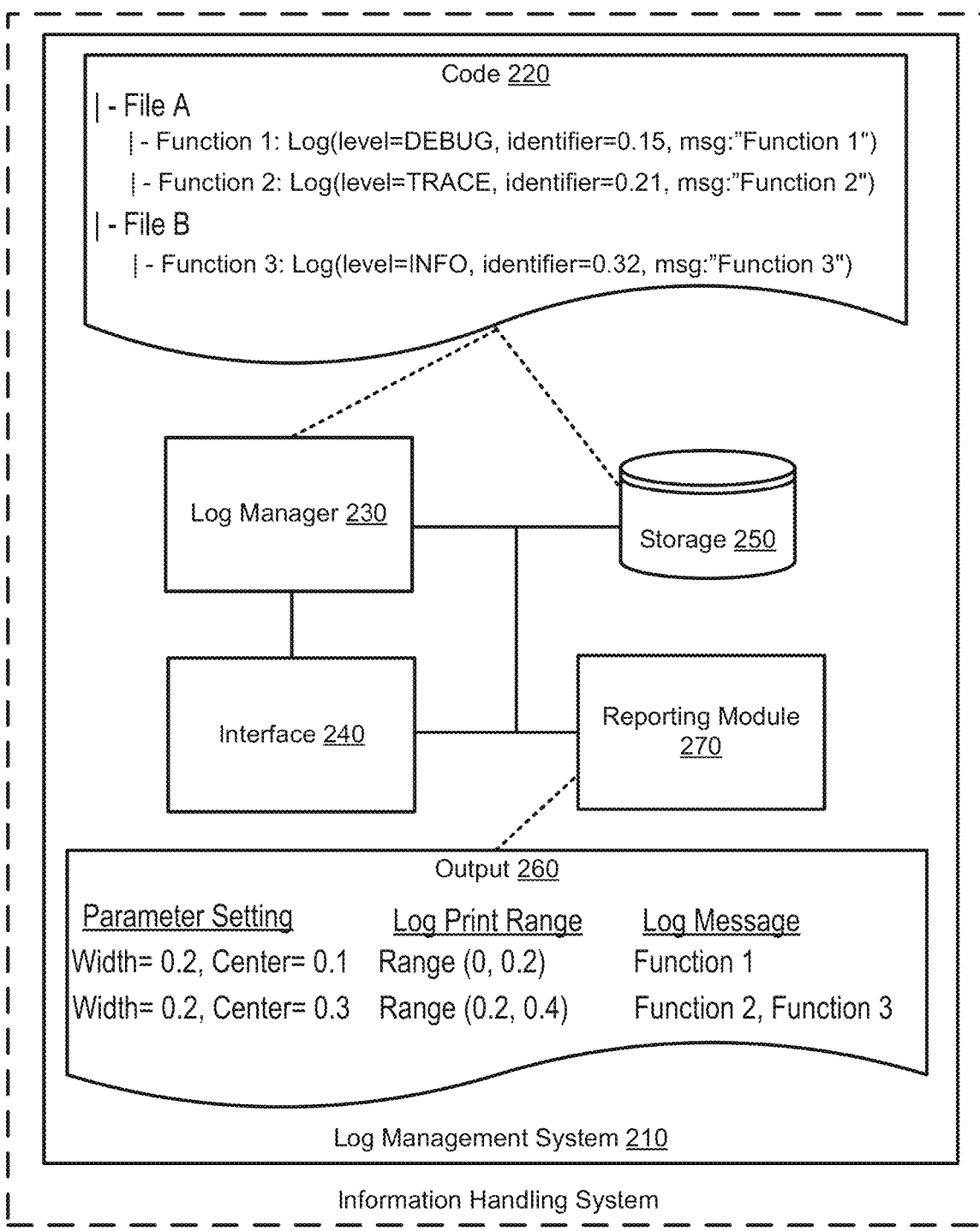
FIG. 2 is a block diagram illustrating an example of a system for software-based log management, according to an embodiment of the present disclosure.

FIG. 2 illustrates an information handling system 200 for software-based log management. Information handling system 200 which is similar to information handling system 100 of FIG. 1 includes a log management system 210 which further includes a log manager 230, an interface 240, a storage 250, and a reporting module 270. The components of log management system 210 may be implemented in hardware, software, firmware, or any combination thereof. Also, the components shown are not drawn to scale, and log management system 210 may include additional or fewer components. In addition, connections between components may be omitted for descriptive clarity.

Log manager 230 may be configured to filter logs and/or log messages associated with firmware or software code, such that it determines whether to print the logs and/or log messages at runtime for review. Accordingly, log manager 230 may be configured to mask a portion of the logs and/or the log messages. The log messages are data generated by systems, components, applications, devices, embedded systems, etc. that can be used to monitor its activities and to diagnose and/or troubleshoot issues. The log messages are typically collected and printed or written to logs which may be stored in a non-voltage storage device such as storage 250. The logs may be stored as log files or other formats and include additional information such as a timestamp and contextual information in addition to the log messages. The logs may also be spooled temporarily or written to a pool of volatile storage such as a buffer or cache before storage in the non-volatile storage device. For purposes of this disclosure, the log messages and/or the logs may be referred to herein as simply logs.

Log manager 230 may also be used to configure the logging level of each function to different values, such as informational, trace, debug, warning, etc. For example, log manager 230 may configure the first function to print logs or a portion thereof at a debug level. Log manager 230 may configure a second function to print logs or a portion thereof at a trace level. In addition, log manager 230 may also configure to not print, also referred to as mask the logs or a portion thereof, of a third function. As the verbosity of the logs is different at each level, the user can adjust or filter information as needed. For example, the trace level is generally more verbose than the debug level and the informational level. Because embedded systems have typically fewer resources for logging information, developers of code associated with embedded systems, such as firmware, typically do not use the trace or debug level in printing out the logging information. By using log manager 230, additional logs may be printed and/or stored at a memory or storage device such as storage 250.

In this example, log manager 230 may be configured to manage the logging of functions in code 220. Code 220 may be a firmware code associated with a device or embedded system such as BMC 190 of FIG. 1. Code 220 may be a software code such as an application. Code 220 includes one or more functions. Here, code 220 includes two files, wherein the first file has two functions and the second file has one function. Each function is associated with a log level and a unique identifier that is within a fixed specified range. The fixed range may be specified before the code is released in production. Accordingly, log manager 230 may generate a random unique number to be used as the identifier of each function before the release of code 220 as well. In another embodiment, code 220 may be test code used to test the functionality of the firmware or software code. For example, the test code may include a function call that passes control and arguments to the function. In this example, the identifier may be associated with the function call.

Output 260 shows examples of which logs are printed or masked based on a log print range that is movable in contrast with the fixed range specified above. The log print range is a movable range because it is based on a width parameter value and a center parameter value that depicts the boundaries of the log print range. The set of identifiers in the movable range is a subset of the set of identifiers in the fixed range. The functions associated with identifiers that are included in the log print range is printed. The functions associated with identifiers that are not included in the log print range is not printed or otherwise referred to as masked. In the first example, the log print range is calculated to be [0, 0.2] based on the width parameter value of 0.2 and center parameter value of 0.1, wherein 0.2 is the right boundary and 0 is the left boundary. The right boundary is calculated to be half of the width parameter starting from the center parameter value, which is 0.1+(0.2/2). The left boundary is calculated to be half of the width parameter value from the center parameter in the opposite direction, which translates to 0.1−(0.2/2). Thus, logs of function identifiers that are less than the value of the right boundary and greater than the value of the left boundary are said to be within the log print range. These logs are printed or written to a log file. Logs of function identifiers outside of the log print range are not printed or written to a log file.

In this example, because the identifier of function one is 0.15, which is located within the log print range, the log message associated with this function one is printed or written in a log file while the log messages associated with functions two and three are not printed or written in the log file. In another example, another log print range is calculated to be [0.2, 0.4] based on the width parameter value of 0.2 and the center parameter value of 0.3. Because the identifier of functions two and three are located within the other log print range, the messages associated with functions two and three are printed or written in the log file while the log message associated with function one is masked or not printed/written in the log file.

Storage 250 may be persistent data storage devices and include solid-state disks, hard disk drives, magnetic tape libraries, optical disk drives, magneto-optical disk drives, compact disk drives, compact disk arrays, disk array controllers, and/or any computer-readable medium operable to store data. Storage 250 may include a database or a collection of log files that is a central repository of log messages that log manager 230 and/or interface 240 may retrieve, store, and utilize.

Interface 240 may be configured to allow the user to monitor and/or update features associated with log manager 230. For example, interface 240 may be used to update the width parameter value and the center parameter value. In addition, interface 240 may be used to display printed log messages or logs. The details of an interface are known in the art and will not be further described herein, except as may be needed to illustrate the current embodiments.

Reporting module 270 may be configured to generate the logs as directed by log manager 230 and displayed at interface 240. In addition, reporting module 270 may be configured to generate a code coverage report that identifies the coverage of the functions of code 220 based on the logs. For example, the code coverage report may provide a list of the functions that are covered by the test cases. The code coverage may also provide another list of the code functions that are not covered by the test cases. Based on the aforementioned, a percentage of the code functions that are covered by the test cases may be determined. However, one skill in the art may appreciate that the code coverage may be reported in a variety of ways that will fall within the specific disclosure.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. In addition, although log management system 210 is shown implemented in a single information handling system, log management system 210 may be implemented in a plurality of virtual or physical servers which may or may not be geographically co-located. For example, log management system 210 may be hosted in a cloud-based hosting service.

Figure 3:
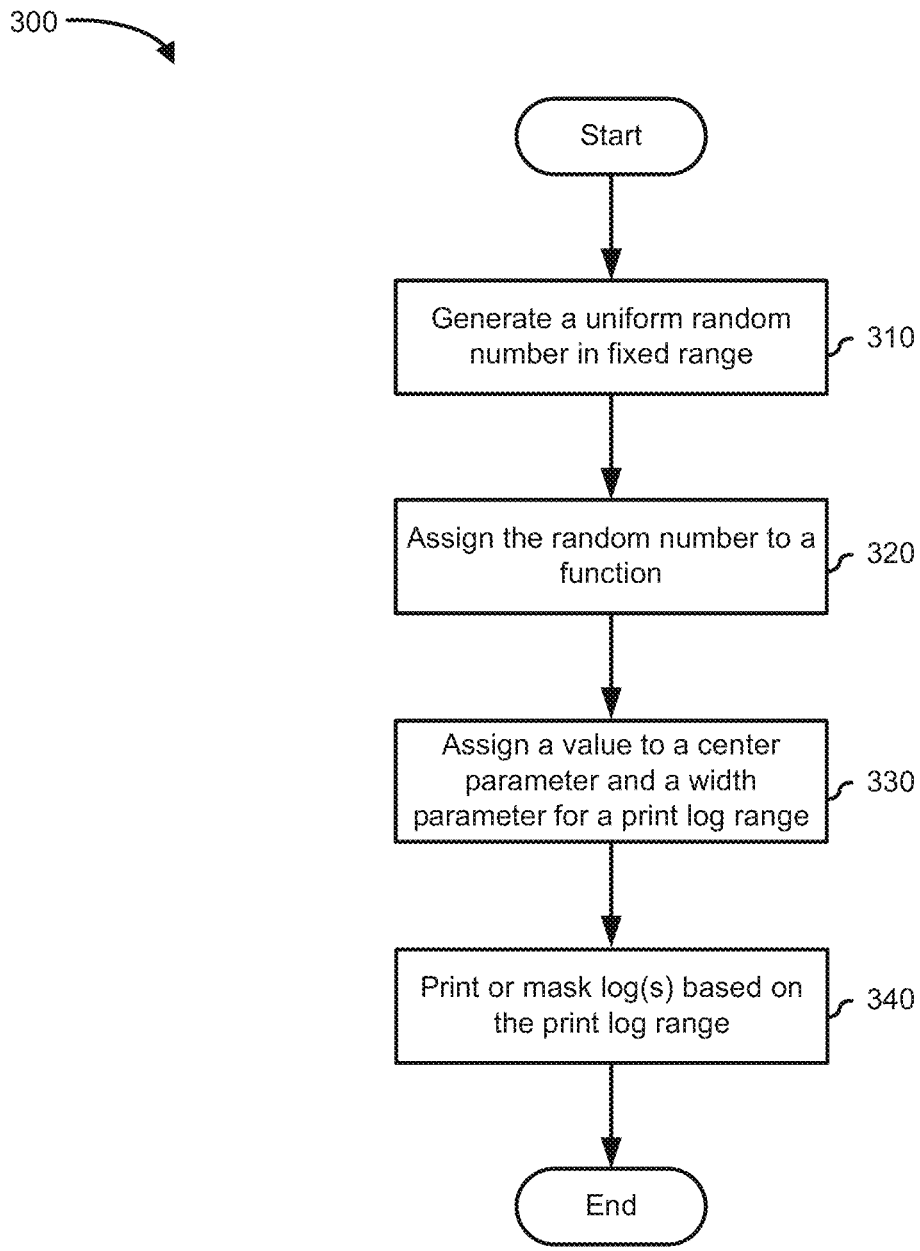
FIG. 3 is a flowchart illustrating an example of a method for software-based log management, according to an embodiment of the present disclosure.

FIG. 3 shows a flowchart of a method 300 for a software-based log management system. Method 300 may be performed by one or more components of log management system 210 of FIG. 2. For example one or more blocks of method 300 may be performed by log manager 230. However, while embodiments of the present disclosure are described in terms of log management system 210 of FIG. 2, it should be recognized that other systems may be utilized to perform the described method. In addition, one of skill in the art will appreciate that this flowchart explains a typical example, which can be extended to advanced applications or services in practice.

At block 310, the method generates a random number, such as a float or integer, within a fixed range. For example, the fixed range of [0, 1], [1, 5], or similar. If the fixed range is [0, 1], then the random number is greater than zero and less than one. The fixed range may be set before block 310 by a user, such as an administrator, developer, etc. At block 320, the method assigns the random number to a function or a function call. For example, the random number may be used as an identifier for the function or the function call, as such the random number is unique compared to the other identifiers assigned to other functions or function calls. The assignment may be performed during the compilation.

Figure 6A:
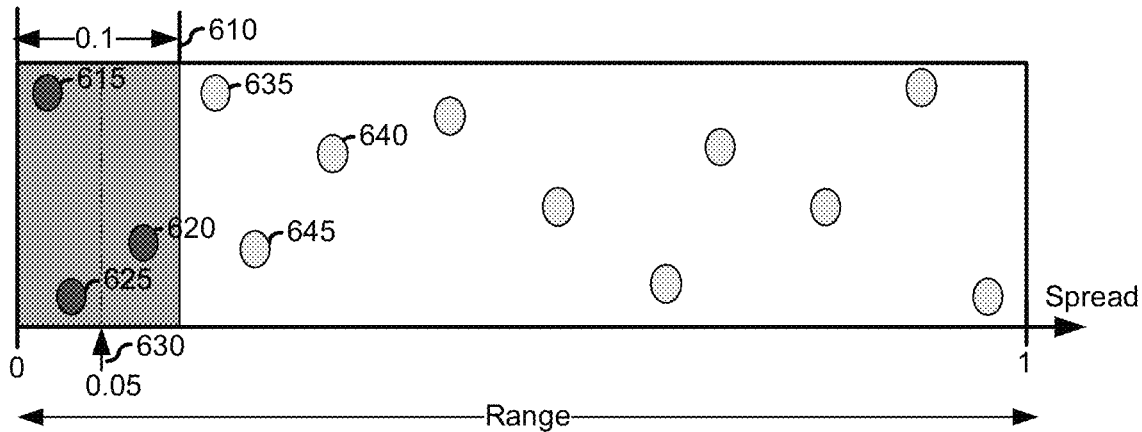
FIGS. 6A, 6B, and 6C are diagrams illustrating examples of various functions spread over a particular range, according to an embodiment of the present disclosure.
Figure 6B:
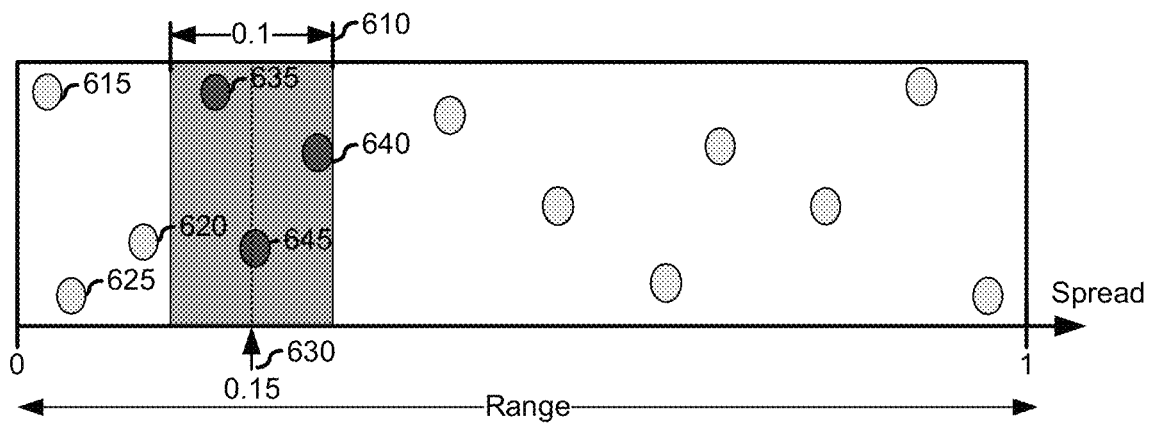
Figure 6C:
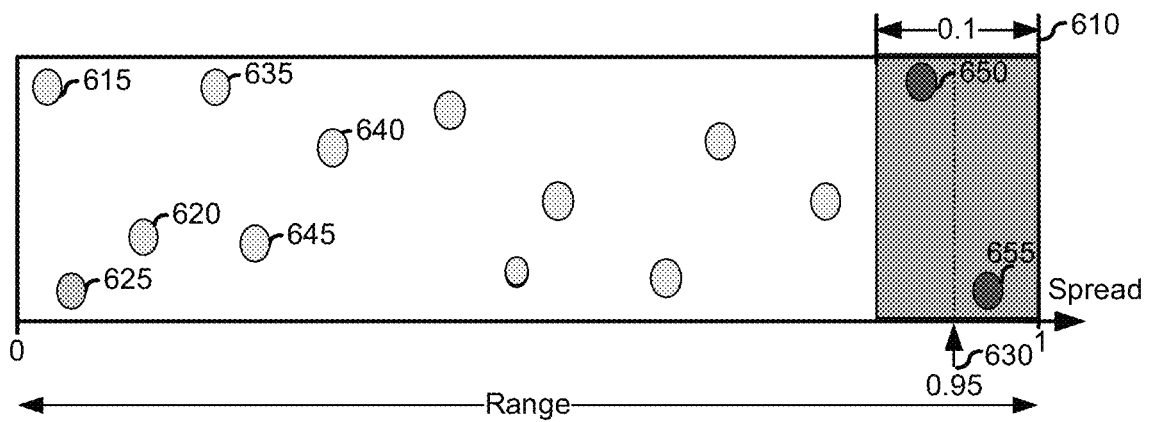

At block 330, the method assigns values to two parameters used for calculating the print log range. The log parameters may be set as "center" and "width." The center and width parameters may determine boundaries of the print log range which is movable within the fixed range, as depicted in FIGS. 6A, 6B, and 6C. The print log range may be smaller or equal to the fixed range. At block 340, the method log(s) is based on the value of parameters center and width. For example, logs of functions with identifiers within the print log range may be printed or written to a log file. For example, if the identifier of the function or the function call falls within the print log range, then the log is printed or written to a log file. If the identifier of the function or the function call is outside of the print log range, then the log is masked. If the values of the center and width parameters are not set then all the logs are printed or written to the log file.

Figure 4:
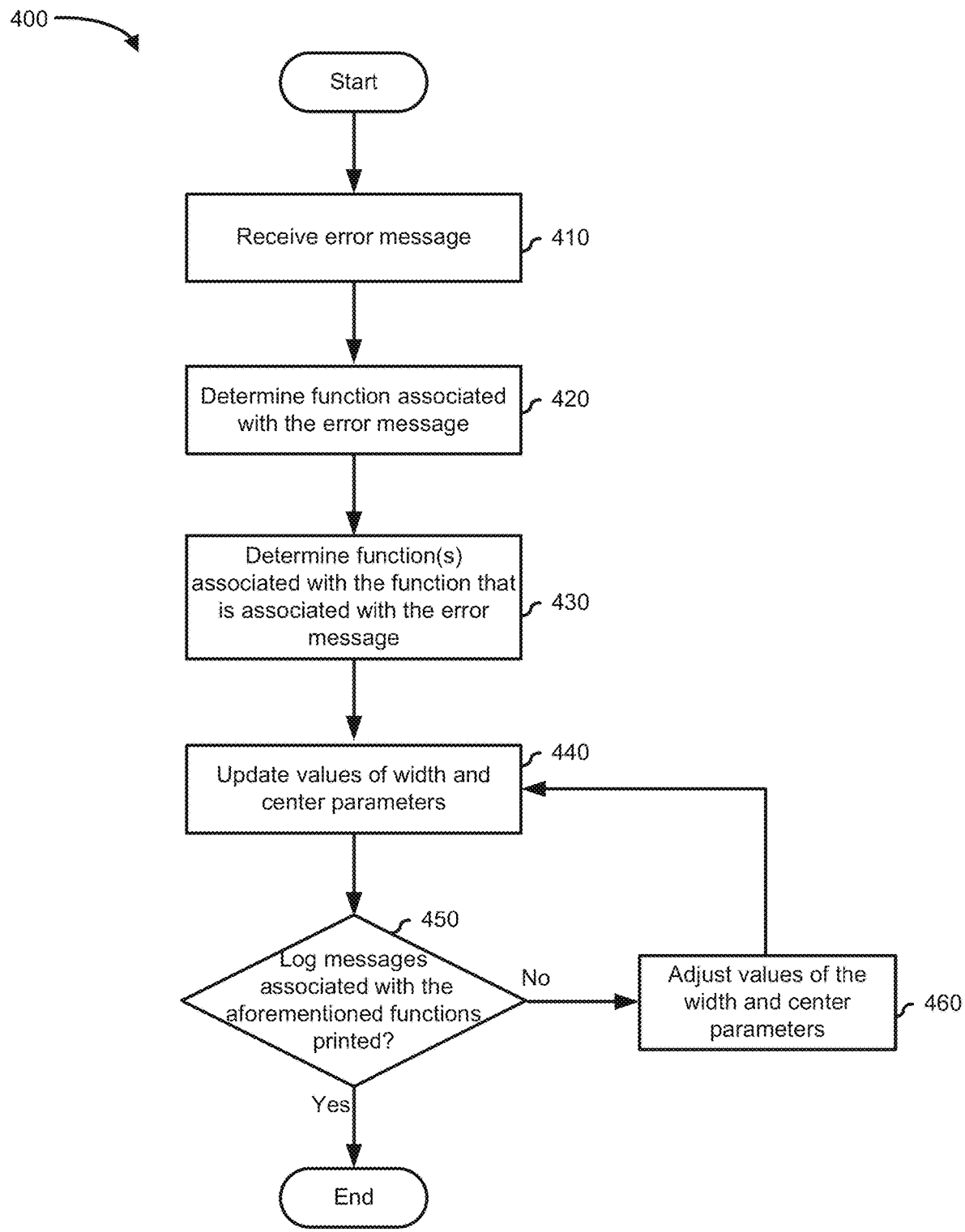
FIG. 4 is a flowchart illustrating an example of a method for software-based log management, according to an embodiment of the present disclosure.

FIG. 4 shows a flowchart of a method 400 for software-based embedded system log management. Method 400 may be performed by one or more components of log management system 210 of FIG. 2. For example one or more blocks of method 400 may be performed by log manager 230. However, while embodiments of the present disclosure are described in terms of log management system 210 of FIG. 2, it should be recognized that other systems may be utilized to perform the described method. In addition, one of skill in the art will appreciate that this flowchart explains a typical example, which can be extended to advanced applications or services in practice.

At block 410, the method receives an error message. The message may be from a function of code currently in a development, test, staging, or production environment. At block 420, the method determines the function(s) or function calls and/or identifiers where the error message is from. This function may be referred to as an originating function. The method proceeds to block 430, where it determines one or more functions or function calls and/or identifiers associated with the originating function or function calls. This function(s) may be referred to as an associated function or function call.

At block 440, the method updates values of center and width parameters for the print log range. The values of the center and width may be inclusive of the originating function/function call and the associated functions/function calls. The values may be updated by a user via an interface. In another embodiment, the method may use standard initial values for the center and width parameters based on the value of the identifier. For example, the standard value for the center parameter is the value of the identifier of the originating function/function call. The value of the width parameter may be based on the distance of the largest or smallest identifier from the center parameter. In another embodiment, the method may determine the largest and smallest value of the identifiers associated with the originating function/function call and the associated functions/function calls. The distance between the largest and smallest value of the identifiers may equal the print log range, where the midpoint of the range is used as the value for the center and the value of the range divided by two is the width.

The method proceeds to decision block 450 where the method determines whether logs associated with the originating function/function and the associated functions/function calls are printed or written to a log file. If the logs associated with the originating function/function call and the associated functions/function calls are printed or written to a log file, then the "YES" branch is taken and the method ends. If the logs associated with the originating function/function call and the associated functions/function calls are not printed or written to a log file, then the "NO" branch is taken and the method proceeds to block 460 where the method adjusts the values of the width and center parameters. The method may increase or decrease the value of the center and width parameters which will be used in updating the parameters in block 440. For example, if a log message associated the function is beyond the print log range, then the method may increase the value of the width parameter. Adjustment of the values may continue until the log messages associated with the originating function and the associated functions are printed or written to the log file. For example, if the log message of one of the associated functions to the originating function is not printed, then the width parameter value may be increased.

Figure 5A:
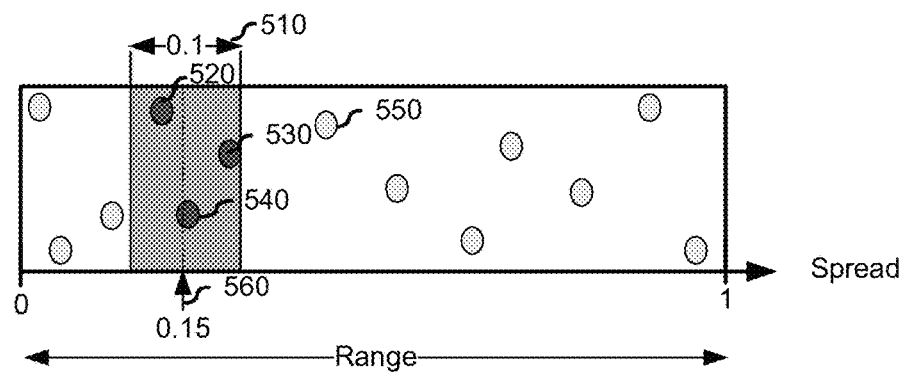
FIGS. 5A, 5B, and 5C are diagrams illustrating examples of various functions spread over a particular range, according to an embodiment of the present disclosure.

FIG. 5A shows an exemplary spread of function identifiers within a fixed range. In this example, the fixed range is [0, 1] while a width parameter 510 has a value of 0.1 and a center parameter 560 with a value of 0.15. Logs of functions with identifiers within the log range which is greater than (center−width/2) and less than (center+width/2) will be printed or written to log files. In this example, logs of functions with identifiers greater than (0.15−(0.1/2)) and less than (0.15+(0.1/2)) will be printed. In particular, functions with identifiers greater than 0.1 and less than 0.2 are within the log range. Here, identifiers of functions 520, 530, and 540 are within the log range. Accordingly, the identifier of function 550 which is greater the 0.2 among others is not within the log range. Thus, logs of functions 520, 530, and 540 may be printed or written to the log file while the logs of the other functions are masked.

Figure 5B:
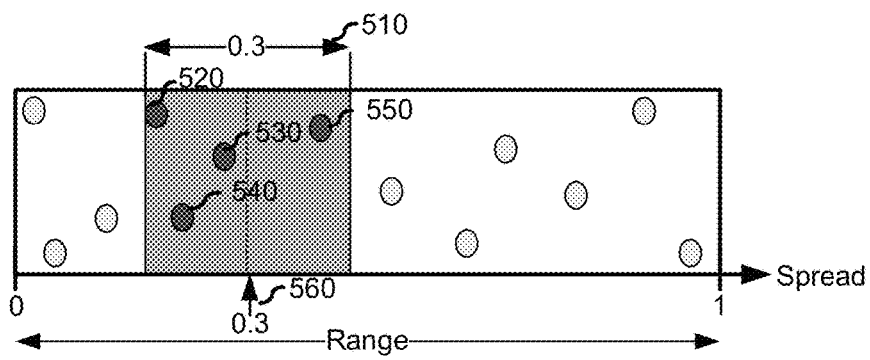
Figure 5C:
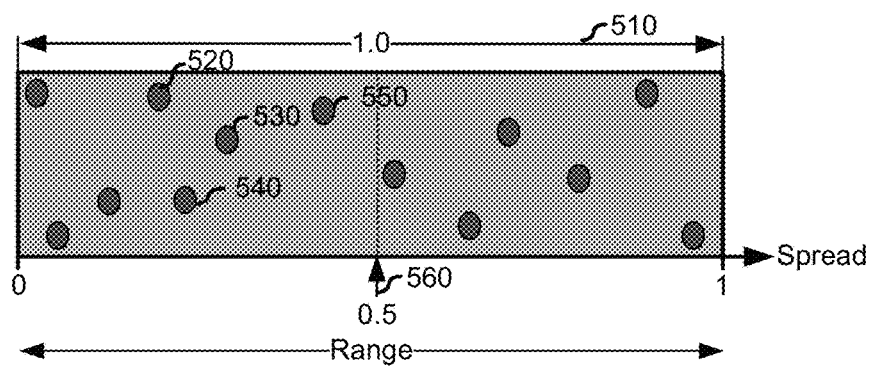

In FIG. 5B, the values of center parameter 560 and width parameter 510 are updated to 0.3 and 0.3 respectively. Here, because of the increase in the width parameter value and the shift of the center parameter value, the area of the print log range increased and shifted to the right which now includes function 550. Thus, the logs of functions 520, 530, 540, and 550 may be printed or written to the log file while the logs of the other functions are masked. In FIG. 5C, the values of center parameter 560 and width parameter 510 are updated to 0.5 and 1.0 respectively. Thus, the log range is equal to the fixed range, and trace messages of all of the functions within the fixed range are printed or written to the log file.

FIG. 6A shows an exemplary spread of function identifiers within a fixed range. In this example, the fixed range is [0, 1] while a width parameter 610 has a value of 0.1 and a center parameter 630 has a value of 0.05. The identifiers of functions 615, 620, and 625 are located within the log print range. Accordingly, log messages associated with functions 615, 620, and 625 may be printed or written in a log file while logs of the other functions are masked. At FIG. 6B, the value of center parameter 630 is updated to 0.15 while the value of width parameter 610 remains at 0.1. The identifiers of functions 635, 640, and 645 are now located within the print log range. The identifiers of functions 615, 620, 625, and others are located outside of the print log range. Accordingly, the log messages associated with functions 635, 640, and 645 may be printed or written to the log file. While the log messages associated with functions 615, 620, 625, and others may be masked. At FIG. 6C, the value of center parameter 630 is updated to 0.95 while the value of width parameter 610 remains at 0.1. Accordingly, functions 650 and 655 are now located within the print log range while the other functions are outside the print log range. Accordingly, the log messages associated with functions 650 and 655 may be printed or written to the log file while the other log messages are masked.

The spread of the function/function call identifiers is shown across a rectangular area for visual simplicity. The identifiers may be instead shown in a number line where the identifiers are located at specially-marked points on the number line. The number line may extend the length of the fixed range starting from the left number in the range and ending at the right number. For example, of the fixed range [0, 1], the line number may start at zero and end in one with the identifiers in between zero and one.

The term "user" in this context should be understood to encompass, by way of example and without limitation, a user device, a user application, a person utilizing or otherwise associated with the device, or a combination of both. An operation described herein as being performed by a user may therefore be performed by a user device/application, or by a combination of the person, application, and/or the device.

Although FIG. 3, and FIG. 4 show example blocks of method 300 and method 400 in some implementation, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, blocks 320 and 330 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor, an error message;
determining a first function identifier associated with the error message;

determining a second function identifier associated with the first function identifier;

setting a center parameter value and a width parameter value that are used in calculating a movable range of function identifiers; and in response to determining that the functional identifiers in the movable range at runtime includes the first function identifier and the second function identifier, printing a first log associated with the first function identifier and a second log associated with the second function identifier.

2. The method of claim 1, wherein the functions identifiers are assigned during compilation.

3. The method of claim 1, wherein the movable range is a subset of a fixed range of the function identifiers.

4. The method of claim 1, wherein the movable range is based on boundaries determined by the center parameter value and the width parameter value.

5. The method of claim 1, further comprising masking a plurality of logs associated with other function identifiers that are not within the movable range.

6. The method of claim 1, further comprising updating the center parameter value and the width parameter value in response to determining that a third log message associated with a third function identifier associated with the first function identifier is not printed.

7. The method of claim 1, wherein the functional identifiers that are within the movable range are a subset of other function identifiers in a fixed range.

8. An information handling system, comprising:
a processor; and
a memory associated with the processor and configured to:
    receive an error message;
    determine a first function identifier associated with the error message;
    determine a second function identifier associated with the first function identifier;
    set a center parameter value and a width parameter value that are used to calculate a movable range that includes the first function identifier and the second function identifier;
    determine whether the first function identifier and the second function identifier are within the movable range at runtime; and
    in response to a determination that the first function identifier is within the movable range, print logs associated with the first function identifier.

9. The information handling system of claim 8, wherein the first function identifier and the second function identifier are assigned during compilation.

10. The information handling system of claim 8, wherein function identifiers that are within the movable range is a subset of other function identifiers in a fixed range.

11. The information handling system of claim 8, wherein the movable range is based on boundaries determined by the center parameter value and the width parameter value.

12. The information handling system of claim 8, wherein the processor is further configured to mask other logs associated with other function identifiers that are not within the movable range.

13. The information handling system of claim 8, wherein the processor is further configured to update the center parameter value and the width parameter value in response to a determination that a third log message associated with a third function identifier that is associated with the first function identifier is not printed.

14. A non-transitory computer-readable media to store instructions that are executable to perform operations comprising:
    generating a random number within a fixed range of numeric values;
    assigning the random number as an identifier to a function;
    in response to determining at runtime whether the identifier is located within a movable range of identifiers, wherein the movable range is a subset of the fixed range, printing a log message associated with the function; and
    printing other log messages associated with other functions whose other identifiers are located within the movable range.

15. The non-transitory computer-readable media of claim 14, wherein the assigning of the random number as the identifier is performed during compilation.

16. The non-transitory computer-readable media of claim 14, wherein the identifier that is within the movable range is a subset of other function identifiers in a fixed range.

17. The non-transitory computer-readable media of claim 14, wherein the movable range is based on boundaries determined by a center parameter value and a width parameter value.

18. The non-transitory computer-readable media of claim 17, further comprising updating the center parameter value and the width parameter value in response to determining that another log message of another function associated with the function is masked.

19. The non-transitory computer-readable media of claim 17, wherein the operations further comprise updating the center parameter value and the width parameter value in response to a determination that a third log message associated with a third function identifier that is associated with a first function identifier is not printed.

20. The non-transitory computer-readable media of claim 14, further comprising masking other log messages associated with other function identifiers that are not included in the movable range.

* * * * *